RUTTER & ROUZER.
Smut Mill.
No. 10,074.
Patented Oct. 4, 1853.
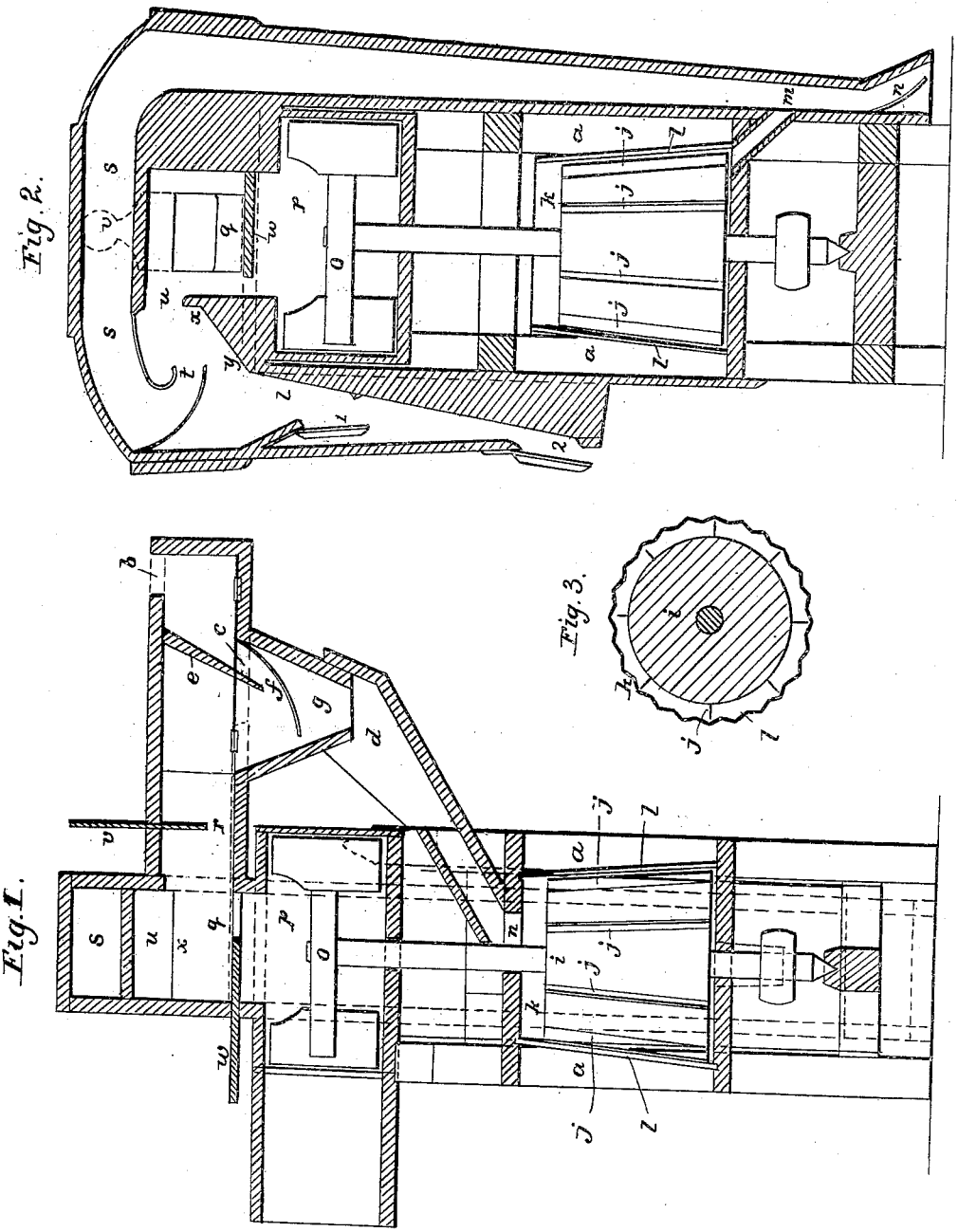

UNITED STATES PATENT OFFICE.

BENJAMIN RUTTER AND HENRY ROUZER, OF PIQUA, OHIO.

SMUT-MACHINE.

Specification of Letters Patent No. 10,074, dated October 4, 1853.

*To all whom it may concern:*

Be it known that we, BENJAMIN RUTTER and HENRY ROUZER, both of Piqua, Miami county, Ohio, have invented a new and useful Machine for Cleaning and Separating Grain; and we hereby declare the following to be a full, clear, and exact description thereof, reference being had to the annexed drawings, making part of this specification.

The objects of our invention are to thoroughly cleanse wheat or other grain of all impurities, and also to separate the imperfect grains (which are of some use for feed, &c.) from both the good grain and from the dirt.

In the accompanying drawings Figure 1 is a vertical section through the feed tube, &c. Fig. 2 is a vertical section through the discharge spouts. Fig. 3 is a horizontal section through the scouring cylinder and concave.

($a$) is a suitable frame.

($b$) is the feed aperture opening into a tube ($c$), whose bottom is furnished with a funnel ($g$) leading into a spout or hopper ($d$).

A directing board ($e$) reaching down obliquely from the top of the tube, conducts the grain into the funnel ($g$), while at the same time the straw, chaff, and loose dust are driven up through the tube on the other side of the board ($e$) and ejected as hereafter described. The grain from the tube falls first upon a curved and obliquely placed screen ($f$), along which it spreads in descending, so as to give the greatest possible scope to the atmospheric action just spoken of. From the lower edge of the screen, the grain drops through the funnel ($g$) into the sloping hopper ($d$), which conducts it through the floor ($h$) onto the top of a conical scouring drum ($i$), and revolving within a case or shell ($k$), fluted or corrugated as represented in the horizontal section. The grain, in descending through the annular space between the drum and case, is violently beaten between the wings ($j$) on the drum and the ridges ($l$) on the inner side of the shell. From the bottom of this space, the grain and dust, now effectually loosened and disengaged from each other, drop together into the lower end of the spout ($m$), where, meeting with a sharp upward draft of air, the dust is at once drawn up through the spout, by the action of the fan hereafter explained, and the grain is scattered on a curved and sloping screen ($n$) similar to the one $f$ at the entrance passage, and for a similar object, with reference in this instance to dust and light grain rather than chaff. From this screen the good grain finally escapes at the lower entrance of the spout, which is narrowed just enough to give the rapidity or force of draft requisite to carry up the light grain and dust, but to allow the good grain to descend.

The draft is produced by a fan ($o$) of usual construction, revolving within a case ($p$); this fan case communicates at its center with an upper chamber ($q$). This chamber has communication both with the entrance tube ($c$) and with the draft spout ($m$), with the former by the aperture ($r$), and with the latter, by the circuitous channel ($s$, $t$, $u$). The communication with the entrance tube, is capable of being either partially or entirely closed by a damper ($v$) according to the condition of the material being operated on with respect to the quantity of chaff and other loose matters which it is desired to eject in the first instance, and also according to the amount of draft which is needed at the bottom of the draft spout, to carry up the light grain. These objects are also still further facilitated by means of another damper ($w$) by which the opening into the fan case may be enlarged or diminished, but never entirely closed. The draft spout ($m$) is continued along the top of the machine, in the form of a channel ($s$), whence the passage curves downward and backward at ($t$) and the lighter particles such as dust, &c., pass through the throat ($u$) and are drawn into and discharged by the fan, while the light grain descending by its greater specific gravity, comes in contact with the ledge ($x$), and sliding down the incline ($y$), escapes through the spout ($z$). This spout is provided with two valves (1, 2,), (one near its entrance and the other near its discharging end) for the purpose of modulating the discharge of the contents.

We claim herein as new and of our inven- tion and desire to secure by Letters Patent—

The narrowing of the spout near the grain discharge (m) in combination with the curved passages s t u, which receive and discharge at their respective apertures, the light grain and trash taken from the grain discharge aperture (m).

In testimony whereof, we have hereunto set our hands before two subscribing witnesses.

BENJAMIN RUTTER.
HENRY ROUZER.

Witnesses:
I. A. CROPLAND,
JAMES CONNARD.